(12) United States Patent
Metla et al.

(10) Patent No.: US 8,877,324 B2
(45) Date of Patent: Nov. 4, 2014

(54) POLYAMIDES AS BINDERS FOR PRINTING INKS

(75) Inventors: Dharakumar Metla, Chalfont, PA (US); Vasudevan Balasubramaniam, Goshen, NY (US); Matthew Bianchi, Northville, MI (US)

(73) Assignee: Cognis IP Management GmbH, Duesseldorf (DE)

( * ) Notice: Subject to any disclaimer, the term of this patent is extended or adjusted under 35 U.S.C. 154(b) by 105 days.

(21) Appl. No.: 13/413,777

(22) Filed: Mar. 7, 2012

(65) Prior Publication Data

US 2012/0231235 A1  Sep. 13, 2012

Related U.S. Application Data

(60) Provisional application No. 61/450,645, filed on Mar. 9, 2011.

(51) Int. Cl.
| | | |
|---|---|---|
| B32B 3/10 | (2006.01) |
| C09D 11/10 | (2014.01) |
| C09D 11/102 | (2014.01) |
| C09D 177/08 | (2006.01) |
| H02M 3/335 | (2006.01) |
| C09D 11/00 | (2014.01) |
| C08G 69/34 | (2006.01) |
| H02M 1/00 | (2006.01) |

(52) U.S. Cl.
CPC ............ *H02M 3/33523* (2013.01); *Y02B 70/16* (2013.01); *C09D 11/102* (2013.01); *Y02B 70/1433* (2013.01); *H02M 2001/0035* (2013.01); *C09D 177/08* (2013.01); *C09D 11/00* (2013.01); *C08G 69/34* (2013.01); *B32B 3/10* (2013.01)
USPC .......................... 428/195.1; 524/607; 427/256

(58) Field of Classification Search
None
See application file for complete search history.

(56) References Cited

U.S. PATENT DOCUMENTS

| | | | |
|---|---|---|---|
| 3,412,115 A | 11/1968 | Floyd et al. | |
| 4,571,267 A | 2/1986 | Drawert et al. | |
| 6,710,121 B2 | 3/2004 | Miller et al. | |
| 7,655,736 B2 | 2/2010 | Vedage et al. | |
| 2005/0134664 A1* | 6/2005 | Pavlin ........................... 347/100 |

FOREIGN PATENT DOCUMENTS

| | | |
|---|---|---|
| DE | 1520940 | 2/1970 |
| DE | 1645408 | 5/1970 |
| GB | 1129595 | 10/1968 |

OTHER PUBLICATIONS

CRODA Product Finder Pripol TM 1013, 1 pgs.
Product Data Sheet Unidyme 18, 1 pg.

* cited by examiner

*Primary Examiner* — Vu A Nguyen
(74) *Attorney, Agent, or Firm* — Servilla Whitney LLC

(57) ABSTRACT

One aspect of the present invention relates to the use of a polyamide as a binder for printing inks, wherein the polyamide is a reaction product (P) of (1) one or more compounds which are chosen from the group of primary and/or secondary monoamines and polyamines with (2) a dimer fatty acid and (3) a carboxylic monoacid, with the proviso that the dimer fatty acid (2) building block of (P) contains at least 30% by weight of monomer fatty acid.

10 Claims, No Drawings

POLYAMIDES AS BINDERS FOR PRINTING INKS

CROSS REFERENCE TO RELATED APPLICATIONS

This application claims priority to U.S. Provision Application 61/450,645, filed on Mar. 9, 2011, which is incorporated herein by reference in its entirety.

FIELD

The invention relates generally to binders for printing inks Specifically, the invention relates to polyamides suitable for use as binders for printing inks.

SUMMARY

One aspect of the invention relates to the use of a polyamide as binder for printing inks. The polyamide is a reaction product (P) of (1) one or more compounds which are chosen from the group of primary and/or secondary monoamines and polyamines with (2) a dimer fatty acid and (3) a carboxylic monoacid, with the proviso that the dimer fatty acid (2) building block of (P) contains at least 30% of monomer fatty acid.

Another aspect of the invention relates to a method of binding printer inks to substrates. The method comprises using a polyamide as a binder for printing inks, wherein the polyamide is a reaction product (P) of (1) one or more amines selected from the group consisting of primary and secondary monoamines and polyamines, (2) a dimer fatty acid, and (3) a carboxylic monoacid, with the proviso that the dimer fatty acid contains at least about 30% by weight of a monomer fatty acid. The components (1), (2) and (3) can be varied. For example, in one embodiment, the dimer fatty acid is based on the oligomerization of oleic acid or linoleic acid. In another embodiment, the dimer fatty acid is based on the oligomerization of tall oil fatty acids.

In other embodiments, a variety of amines can be used. For example, in one embodiment, the one or more amines comprise primary or secondary amines having at least two nitrogen atoms and at least two active amino hydrogen atoms per molecule. In yet other embodiments, the one or more amines have a structure represented by formula (I):

$$H_2NCH_2CH_2(NHCH_2CH_2)_xNH_2 \quad (I)$$

wherein x is greater than or equal to 1. In other variants, the one or more amines comprises a mixture comprising tetraethylenepentamine, pentaethylenehexamine and hexaethyleneheptamine, or the amine can be chosen from the group consisting of ethylenediamine and 1,6-hexanediamine.

Additionally, different types of the carboxylic monoacid (3) can be chosen. In one example, the carboxylic monoacid (3) is a fatty acid with 1 to 24 carbon atoms.

Another aspect of the invention relates to a laminating ink composition for laminated packaging applications, the ink comprising (i) the reaction product (P) described above, (ii) a colorant, and (iii) an organic solvent. The components of reaction product (P) can be chosen or varied as in the previous aspect.

A fourth aspect of the invention relates to a laminate for use in packaging applications, which laminate comprises a polymeric substrate printed with the ink composition of claim 8.

BACKGROUND

Polyamides based on dimer fatty acids and diamines are known to be useful as binders in liquid inks, especially for packaging applications. These polyamides show excellent solubility and adhesion to numerous substrates especially plastic films such as polyester, nylon and polyolefins.

German patent DE 1520940 describes polyamides comprising dimerized fatty acids, an unbranched aliphatic monocarboxylic acid with 1 to 5 carbon atoms, ethylenediamine and an unbranched co-diamine with 4 to 10 carbon atoms as binders for printing inks. The purity of the dimerized fatty acid used in the examples varied in the range between 75% and 99%.

German patent DE 1645408 describes polyamides comprising dimerized fatty acids, an unbranched aliphatic monocarboxylic acid with 1 to 5 carbon atoms, ethylenediamine and aromatic or cycloaliphatic co-diamines as binders for printing inks.

U.S. Pat. No. 3,412,115 describes polyamides comprising a dimeric fatty acid, an alkylenediamine having from 2 to 3 carbon atoms, hexanemonocarboxylic acids and optional further monocarboxylic acids as binders for printing inks. The patent discloses (column 3, lines 7 to 13) that typical compositions of commercially available polymeric fatty acids (manufactured by oligomerization of C18 unsaturated fatty acids) is: 5 to 15% monobasic acids, 60 to 80% dibasic acids and 10 to 35% tribasic (and higher) acids. For the purpose of the invention disclosed in U.S. Pat. No. 3,412,115 the monomeric fatty acid content can vary from 1 to 5% as low range and from 15 to 20% as high range.

U.S. Pat. No. 4,571,267 describes polyamides which comprise polymerized fatty acids, at least one unbranched and one branched monocarboxylic acid, ethylenediamine and hexamethylenediamine as binders for printing inks. According to the examples of the patent the commercial dimeric fatty acid which was used to prepare the polyamides had a dimer content of 75%.

U.S. Pat. No. 6,710,121 B2 describes nitrocellulose-compatible laminating ink resins which are prepared by reacting together reactants including polymerized fatty acid, co-diacid, monoacid, secondary diamine and C6-diamine, where the co-diacid comprises 1,4-cyclohexanedicarboxylic acid. The patent discloses (column 3, lines 32ff) that the polymerized fatty acid contains preferably less than 25% of trimer acid and high.order polymerization product and that dimer acid constitute at least about 75% of the polymerized fatty acid, preferably 80-90% dimer fatty acid and in one aspect essentially all of the polymerized fatty acid.

The polyamides of the state of the art based on dimeric fatty acid have in common that the dimer fatty acid content is high, at least 75% and that the amount of monomeric species is low, typically 5 to 15% with a maximum amount for monomeric species of 15 to 20% (see citation of U.S. Pat. No. 3,412,115 above).

DETAILED DESCRIPTION

Provided are polyamides suitable as binder for printing inks, especially as binder for printing inks which are liquid at 20° C., with improved gloss.

One aspect of the present invention relates to the use of a polyamide as binder for printing inks wherein the polyamide is a reaction product (P) of (1) one or more compounds which are chosen from the group of primary and/or secondary monoamines and polyamines with (2) a dimer fatty acid and (3) a carboxylic monoacid, with the proviso that the dimer fatty acid (2) building block of (P) contains at least 30% by weight of monomer fatty acid.

The Amines (1)

In one or more embodiments, the amines (1) are chosen from the group of primary and/or secondary monoamines and polyamines.

In one or more specific embodiments, aliphatic, aromatic, aliphatic-aromatic, cycloaliphatic, and heterocyclic diamines and polyamines can be utilized as compounds (1). In U.S. Pat. No. 7,655,736 B2 (see column 4, line 61-column 5, line 18) multifunctional amines are listed; from this list those amines may be used, which fulfill the definition of compounds (1) above. U.S. Pat. No. 7,655,736 is hereby incorporated by reference in its entirety.

In other embodiments, the amines (1) are primary and/or secondary amines having at least two nitrogen atoms and at least two active amino hydrogen atoms per molecule.

Examples of suitable polyamines (1) include, but are not limited to: 1,2-Ethylenediamine, diethylenetriamine (DETA), 1,2-propylenediamine, 1,3-propylenediamine, 1,4-butanediamine, 1,5-pentanediamine, 1,3-pentanediamine, 1,6-hexanediamine (hexamethylenediamine), 3,3,5-trimethyl-1,6-hexanediamine, 3,5,5-trimethyl-1,6-hexanediamine, 2-methyl-1,5-pentanediamine, bis (3-aminopropyl) amine, N,N'-bis(3-aminopropyl)-1,2-ethanediamine, N-(3-aminopropyl)-1,2-ethanediamine, 1,2-diaminocyclohexane, 1,3-diaminocyclohexane, 1,4-diaminocyclohexane, poly (alkylene oxide) diamines and triamines (such as, for example, JEFFAMINE® D-230, JEFFAMINE® D-400, JEFFAMINE® D-2000, JEFFAMINE® D-4000, JEFFAMINE® T-403, JEFFAMINE® EDR-148, JEFFAMINE® EDR-192, JEFFAMINE® C-346, JEFFAMINE® ED-600, JEFFAMINE® ED-900, JEFFAMINE® ED-2001), meta-xylylenediamine, phenylenediamine, 4,4'-diaminodiphenylmethane, toluenediamine, isophoronediamine, 3,3'-dimethyl-4,4'-diaminodicyclohexylmethane, 4,4'-diaminodicyclohexylmethane, 2,4'-diaminodicyclohexylmethane, 1,3-bis(aminomethyl) cyclohexane, the mixture of poly(cyclohexyl-aromatic) amines linked via a methylene bridge (also known as MBPCAAs) and polyaminoamides.

In one embodiment, amines (1) are characterized by formula (I)

$$H_2NCH_2CH_2(NHCH_2CH_2)_xNH_2 \quad (I)$$

with x=1 or higher. An example of a technical mixture of amines (I) is E-100, available from Huntsman, comprising tetraethylenepentamine (TEPA), pentaethylenehexamine (PEHA) and hex aethyleneheptamine (HEHA).

In very specific embodiments, ethylenediamine and 1,6-hexanediamine are particularly are used as compounds (1).

In alternate variants, the compounds (1) can be used individually or in a mixture with one another.

The Dimer Fatty Acid (2)

Dimer fatty acids are carboxylic acids which may be obtained by oligomerization of unsaturated carboxylic acids, generally fatty acids, such as oleic acid, linoleic acid, erucic acid and the like. In one or more embodiments of the invention, the oligomerization is carried out at elevated temperature in the presence of a catalyst, for example of clay. The substances obtained by oligomerization of unsaturated carboxylic acids are mixtures of so-called monomer fatty acids, dimer fatty acids and higher oligomers, more specifically so-called trimer fatty acids.

In this connection, it is pointed out that the expression "monomer fatty acids" is known to one having ordinary skill in the art, cf. for example the paragraph bridging pages 770 and 771 in the chapter "Dimer Acids" of the reference book Kirk-Othmer, Encyclopedia of Chemical Technology, 3rd Edition, Vol. 7 (1979).

In certain embodiments, the monomer fatty acids are not unreacted starting material of the process for producing dimer fatty acids, but rather products of a secondary reaction containing small amounts of unreacted starting material. The secondary reaction can lead to a structural modification of the fatty acids used.

Dimer fatty acids are commercially available products and are marketed in various compositions and qualities. Typically commercially available dimer fatty acids are not the crude products resulting from the oligomerization of unsaturated carboxylic acids, but the products obtained by distillation of these crude products. Distilled dimer fatty acids contain at least 75% and more particularly at least 90% by weight dimer fatty acids in which the number of carbon atoms per dimer fatty acid molecule is mainly in the range from 36 to 44.

In a specific embodiment of the invention, the dimer fatty acids (2) of the present invention contain an amount of at least 30% by weight of monomeric fatty acids. These dimer fatty acids (2) of the invention can be based on the oligomerization of either oleic acid or linoleic acid or a mixture of oleic and linoleic acid. The so-called tall oil fatty acids can be used in specific embodiments as starting material for the manufacture of the dimer fatty acids (2) of the present invention.

The Carboxylic Monoacid (3)

The term "carboxylic monoacid" refers to carboxylic acids which contain one COOH group per molecule.

In one embodiment fatty acids are used as compound (3), especially fatty acids with 1 to 24 carbon atoms, for example acetic acid or propionic acid.

In one embodiment, a tall oil fatty acid is used as compound (3). Tall oil fatty acid (TOFA) is known to a person skilled in the art and usually manufactured starting from tall oil. Tall oil, also called liquid rosin or tallol, is a viscous yellow-black odorous liquid obtained as a co-product of the Kraft process of wood pulp manufacture when pulping mainly coniferous trees. Normally crude tall oil contains rosins, unsaponifiable sterols, resin acids (mainly abietic acid and its isomers), fatty acids (mainly palmitic acid, oleic acid and linoleic acid), fatty alcohols, some sterols, and other alkyl hydrocarbon derivates. By fractional distillation tall oil rosin is obtained, with rosin content reduced to 10-35%. By further reduction of the rosin content to 1-10%, tall oil fatty acid (TOFA) can be obtained, which is cheap, consists mostly of oleic acid, and is a source of volatile fatty acids.

In one embodiment mixtures of fatty acids with 1 to 24 carbon atoms and tall oil fatty acid are used as compound (3).

EXAMPLES

% in the following has to be understood as % by weight.

Example 1

Polyamide Resin According to the Invention

A reaction flask was charged with 49.05% of crude dimer acid (Empol® 1005 by Cognis), 26.41% trimer acid (Empol® 1043 by Cognis), 6.26% propionic acid, 0.02% of 75% phosphoric acid in water and 0.007% Antifoam 1400 (Dow Corning®), and the mixture heated to 100 C. At this temperature 11.18% hexamethylenediamine (70% in water) and 6.63% ethylenediamine were added. The temperature of the mixture is gradually increased to 228° C. and held at this temperature for 1 hour. Then vacuum of about 40 inch Hg was applied for an hour to remove volatiles.

The product was discharged from the flask and characterized. The properties were listed in the Table 2 in comparison with a standard polyamide, Versamid® 757 (Cognis).

TABLE 2

Comparison of new Exp PA with a standard PA (Versamid ® 757).

| Resin Properties | Versamid 757 | Exp PA |
|---|---|---|
| Acid Value | 1.76 | 0.82 |
| Amine Value | 2.50 | 2.95 |
| Brookfield Melt Viscosity at 160 C., cps | 397 | 322 |
| Softening Point, C. | 117 | 122 |
| Color | 6 | 11 |

Performance Examples

TABLE 3

Solution properties

| | 2-propanol | | 1-propanol | | ethanol | |
|---|---|---|---|---|---|---|
| | V 757 | Exp PA | V 757 | Exp PA | V 757 | Exp PA |
| Solution clarity | clear | Clear | clear | Clear | clear | Clear |
| Gel Point, C. | −5 | −5 | −5 | −10 | 0 | −15 |
| Visc, cps @ 25 C. | 43 | 108 | 25 | 80 | 3 | 65 |
| Visc, cps @ 25 C., 1 week | 39 | 113 | 35 | 80 | 6 | 53 |
| Visc, Z#2, sec | 32 | 28 | 30 | 27 | 24 | 21 |
| Visc, Z#2, sec, 1 week | 39 | 34 | 33 | 26 | 26 | 22 |
| Gardner Color | 6 | 11 | 7 | 11 | 6 | 11 |
| Lenetta gloss - white | 69 | 67 | 73 | 64 | 69 | 66 |
| Lenetta gloss - black | 74 | 75 | 81 | 74 | 55 | 75 |

TABLE 4

Viscosity and stability of the inks

| | White ink | | Blue ink | |
|---|---|---|---|---|
| | V 757 | Exp PA | V 757 | Exp PA |
| Viscosity of ink | | | | |
| Visc, initial, Z#2, sec | 49 | 39 | 64 | 63 |
| % dil to 25" Z#2 with 1-PrOH | 24 | 9 | 16 | 10 |
| Visc after dilution | 26 | 29 | 24 | 28 |
| Visc, 24 h, Z#2, sec | 26 | 32 | 23 | 34 |
| Visc, 1 week, sec | 25 | 29 | 23 | 38 |
| Print ink solids,% | 39.55% | 45.53% | 29.45% | 32.43% |
| Stability of ink | | | | |
| Imm. after blending base/varnish | 3 | 3 | 3 | 3 |
| After 24 h | 3 | 2 | 3 | 3 |
| After 1 week | 3 | 2 | 3 | 2 |

1 = phase separation, 2 = sl. separation, 3 = good

TABLE 5

Print properties on BOPP film

| | White inks | | Blue inks | | White over Blue inks | |
|---|---|---|---|---|---|---|
| | V 757 | EXP PA | V 757 | EXP PA | V 757 | EXP PA |
| Inks on T523/3 BOPP, 75ga, corona treat, 38 dynes | | | | | | |
| 610 tape adhesion | 100% | 100% | 100% | 100% | 100% | 100% |
| Color Strength (WI for whites) | 60 | 57 | 100% | 87% | 100% | 80 |
| Ice Crinkle | 10 | 9 | 9 | 9 | 10 | 10 |
| Block resistance | 10 | 10 | 9 | 8 | 10 | 10 |
| Grease resistance | 10 | 9 | 9 | 8 | 10 | 9 |
| Heat Resistance, F. | 400 | 400 | 400 | 450 | 400 | 400 |
| Gloss | 18 | 35 | 91 | 80 | 34 | 50 |
| Rub resistance | over 500 | 200 | 150 | 200 | over 500 | 200 |

TABLE 6

Print properties on PET film

| | White inks | | Blue inks | | White over Blue inks | |
|---|---|---|---|---|---|---|
| | V 757 | Exp PA | V 757 | Exp PA | V 757 | Exp PA |
| Inks on 48LBT PET, 48ga, corona treat, 40 dynes | | | | | | |
| 610 tape adhesion | 100% | 100% | 100% | 100% | 100% | 100% |
| Color Strength | 59 | 59 | 100% | 78% | 100% | 76 |
| Ice Crinkle | 9 | 9 | 9 | 9 | 9 | 9 |
| Block resistance | 9 | 9 | 7 | 7 | 10 | 9 |
| Grease resistance | 10 | 7 | 7 | 8 | 10 | 9 |
| Heat Resistance, F. | 450 | 400 | 300 | 450 | 400 | 450 |
| Gloss | 17 | 28 | 69 | 76 | 32 | 44 |
| Rub resistance | 500 | 200 | 250 | 200 | over 500 | 200 |

TABLE 7

Print properties on PE film

| | White inks | | Blue inks | | White over Blue inks | |
|---|---|---|---|---|---|---|
| | V 757 | Exp PA | V 757 | Exp PA | V 757 | Exp PA |
| Inks on PE, 2 mil, corona treat, 38 dynes | | | | | | |
| 610 tape adhesion | 100% | 100% | 100% | 100% | 100% | 100% |
| Color Strength | 60 | 58 | 100% | 95% | 100% | 80 |
| Ice Crinkle | 10 | 8 | 10 | 9 | 9 | 8 |
| Block resistance | 10 | 10 | 10 | 8 | 10 | 10 |
| Grease resistance | 10 | 7 | 8 | 8 | 9 | 9 |
| Heat Resistance, F. | above 350 | 350 | above 350 | 350 | above 350 | 350 |
| Gloss | 22 | 30 | 67 | 78 | 29 | 49 |
| Rub resistance | over 500 | 200 | 450 | 200 | over 500 | over 500 |

What is claimed is:

1. A method of printing, the method comprising adhering a printing ink to a substrate, wherein the printing ink comprises a polyamide that is effective as a binder and is a reaction product (P) of
   (1) one or more amines comprising a mixture comprising tetraethylenepentamine, pentaethylenehexamine and hexaethyleneheptamine,
   (2) a dimer fatty acid, and
   (3) a carboxylic monoacid, with the proviso that the dimer fatty acid contains at least about 30% by weight of a monomer fatty acid.

2. The method of claim 1, wherein the dimer fatty acid is based on the oligomerization of oleic acid or linoleic acid.

3. The method of claim 1, wherein the dimer fatty acid is based on the oligomerization of tall oil fatty acids.

4. The method of claim 1, wherein the carboxylic monoacid (3) is a carboxylic acid which contains one COOH group and has with 1 to 24 carbon atoms.

5. A laminating ink composition for laminated packaging applications, the ink comprising:
   (i) a polyamide, wherein the polyamide is a reaction product (P) of
      (1) one or more amines comprising a mixture comprising tetraethylenepentamine, pentaethylenehexamine and hexaethyleneheptamine
      (2) a dimer fatty acid and
      (3) a carboxylic monoacid,
      with the proviso that the dimer fatty acid contains at least 30% by weight of a monomer fatty acid,
   (ii) a colorant; and
   (iii) an organic solvent.

6. The ink composition of claim 5 wherein the polyamide (i) is present in an amount of from about 10% to about 50% by weight, the colorant (ii) is present in an amount of from about 6% to about 50% by weight and the solvent (iii) is present in an amount of from about 10% to about 80% by weight, based on the weight of the composition.

7. The ink composition of claim 5, wherein the dimer fatty acid is based on the oligomerization of oleic acid or linoleic acid.

8. The ink composition of claim 5, wherein the dimer fatty acid is are based on the oligomerization of tall oil fatty acids.

9. The ink composition of claim 5, wherein the carboxylic monoacid (3) is a carboxylic acid which contains one COOH group and has 1 to 24 carbon atoms.

10. A laminate for use in packaging applications, which laminate comprises a polymeric substrate printed with the ink composition of claim 4.

* * * * *